W. P. GROOM.
Bale Pressing and Sacking Device.

No. 219,718. Patented Sept. 16, 1879.

Witnesses
John Becker
Fred K Haynes

Inventor
Wallace P. Groom
by his Attorneys
Brown & Brown

UNITED STATES PATENT OFFICE.

WALLACE P. GROOM, OF BROOKLYN, NEW YORK.

IMPROVEMENT IN BALE PRESSING AND SACKING DEVICES.

Specification forming part of Letters Patent No. 219,718, dated September 16, 1879; application filed May 3, 1879.

*To all whom it may concern:*

Be it known that I, WALLACE P. GROOM, of the city of Brooklyn, in the county of Kings and State of New York, have invented certain new and useful Improvements in Bale Pressing and Sacking Devices, of which the following is a description, reference being had to the accompanying drawings, forming part of this specification.

This invention is applicable not only to what are known as "perpetual" or "continuous" baling-presses, in which the material to be pressed is forced in a continuous manner through a press-box and divided into bales or fixed quantities as or before it is discharged from the press, but also to other presses and bagging apparatus or machines. The invention, however, will be here more particularly described with reference to a continuous baling-press.

The invention consists in a combination, in a bag-filling apparatus, with a pressing-box or filling-chamber, of an elastic mouth-piece at the delivery end of said box or chamber, constructed to form a recess in its rear, and of larger transverse dimensions internally at its back than the transverse interior dimensions of said box or chamber, but contracting toward its outer or delivery end, whereby a free discharge is provided for the pressed material from the delivery end of the pressing or filling chamber, room is provided for removing dividers which separate the material in the pressing-box or filling-chamber into fixed or measured quantities, and other advantages are obtained.

The invention also consists in an elastic delivery mouth-piece, composed of separate sides and angle strip or pieces, arranged to cover the adjacent edges of said sides, and applied to the latter to admit of their independent yielding action, whereby the bag while on the mouth-piece is protected from contact at its sides with the pressed material, and the latter prevented from passing out through the openings between the sides of the mouth-piece.

Figure 1:
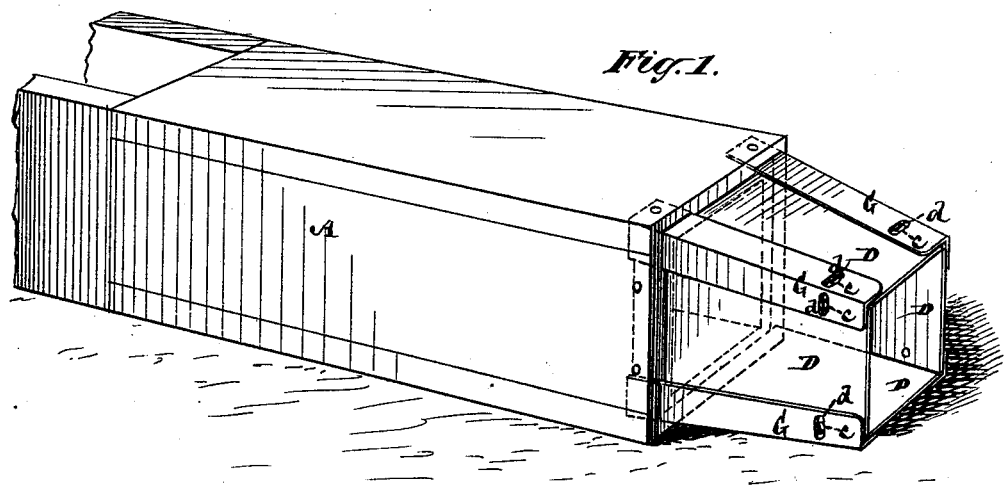
Figure 2:
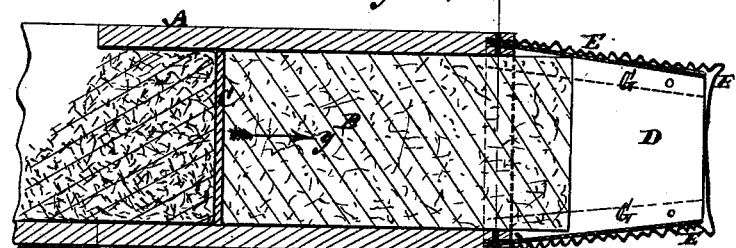
Figure 3:
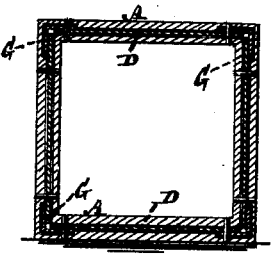
Figure 4:
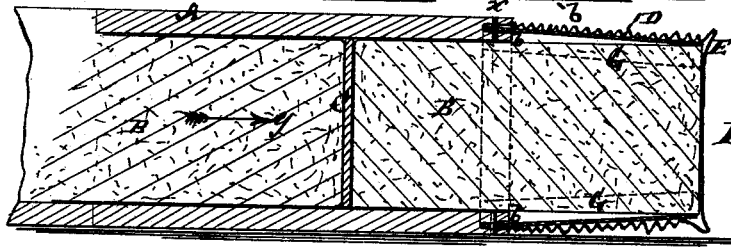
Figure 5:
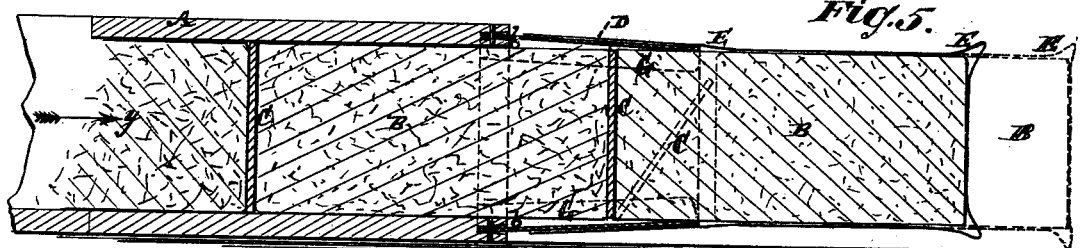
Figure 6:
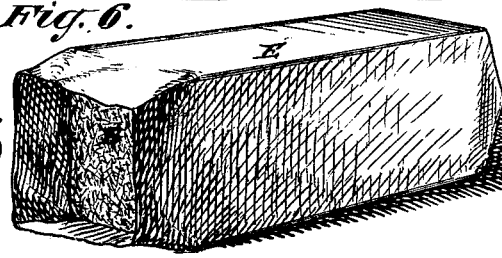

In the accompanying drawings, Figure 1 represents a view, in perspective, of a press-box of a continuous baling-press having my invention applied. Fig. 2 is a longitudinal section through the press-box, with a bag applied to the mouth-piece at the delivery end of said box, and showing a bale shortly after its entry within said mouth-piece. Fig. 3 is a transverse section on the line $x$ $x$ in Fig. 2; Figs. 4 and 5, longitudinal sections in further illustrations of the work; and Fig. 6, a view, in perspective, of a bagged bale or mass of pressed material.

A is the pressing box or chamber of what is known as a "continuous baling-press," into which the material, B, to be pressed is fed, subject to the interposition at regular or stated intervals of loosely-fitting dividers C as said material is forced through and compressed within the pressing-box by a plunger moving in direction of the arrow $y$—that is, toward the mouth-piece D at the delivery end of the pressing box or chamber. This mouth-piece, which is elastic and may be composed of steel or any suitable material, and which may be of about one-half the length of a pressed bale as it is delivered from the pressing-box, is inclined on all sides to the pressing box or trunk, diminishing outward from the delivery end of the pressing-box. Said mouth-piece is made, substantially as shown in Figs. 2, 4, and 5 of the drawings, with its back portion larger or of greater area than the interior of the pressing-box A, and with an offset forming a recess, $b$, at the junction of the mouth-piece with the delivery end of the pressing-box; but the outer end of said mouth-piece is of a reduced size or area, corresponding to that of the pressing-box, or thereabout.

The recess $b$ prevents the bale or mass of material to be packed into a bale from immediately coming into contact with the mouth-piece as it emerges from the delivery end of the pressing-box, and affords ample time for a bag, E, to be fitted onto or over the mouth-piece to receive the bale or mass of pressed material, and, further, affords an opportunity for each divider C in succession to freely pass out of the delivery end of the pressing-box, and for the ready removal of the divider from the mouth-piece back of the bale on drawing off the bag containing the bale or pressed mass.

Said recess *b* prevents the bale or pressed mass, which is liable to expand by its own elasticity as it passes out of the delivery end of the pressing-box, from coming in contact with the sides of the mouth-piece, and provides for the free delivery of the bale from the pressing-box, while the inclined sides of the elastic mouth-piece guide the bale or pressed mass in a compact form into the bag, which is fitted over the delivery end of the mouth-piece.

Fig. 2 of the drawings represents a bale or pressed mass, B, as freely entering and passing into the mouth-piece D without binding on the sides of the latter. The recess *b*, too, or enlarged construction of the mouth-piece in its rear, not only leaves the bale loose, as shown in Fig. 4, within the mouth-piece, excepting at the delivery end of the latter, where it is only lightly held, but such free construction of the mouth-piece permits of the bale, as soon as convenient after its rear end has cleared the delivery end of the pressing-box, being pulled out quickly by hand along with the bag which it has entered, and with the bottom of which only it comes in contact until after reaching the position shown in Fig. 4.

In Fig. 5 an advance bale, B, is represented by full lines as in position ready to be pulled out by hand along with its bag, or it may be pulled out even earlier than this; and the same figure shows, by dotted lines, the same bale as fully drawn out. This quick removal by hand of the bagged bale is important, inasmuch as it gives time for removal of the divider C which precedes the succeeding bale, and for the placing of a fresh bag over the mouth-piece D to keep up a continuous action. The recess *b* in rear of said mouth-piece, and enlarged construction of the latter, excepting at its outer or delivery end, also provides for the loosening of the dividers and their easy removal in succession from the mouth-piece D as or immediately after each bale is drawn from the mouth-piece by hand, the dividers then falling toward the bottom of the mouth-piece, as shown by dotted lines in Fig. 5. Thus the loose dividers C are not forced into the bag.

The pressing-box or chamber may, if desired, be provided with grooves or slots for inserting bands to bind the bales; but as such provision is well understood and is common to other presses, no description of the same is here necessary, and for some materials bands or bale-tying devices may not be necessary, and the apparatus be used more particularly for filling sacks or bags without having recourse to bands for separately binding the bales or separated masses of material entering the sacks or bags.

The several sides of the elastic mouth-piece D are separate from each other, but connected in a yielding manner by independent angle strips or pieces G, each of which has its respective sides connected with the sides of the mouth-piece they lap over by means of pins or screws *c*, passing through slots *d* in the sides of the angle-strips; or said angle strips may be held to their places with freedom for the independent yielding of the sides of the mouth-piece by springs supplied to the exterior of the strips. These angle strips or pieces G close the openings between the adjacent edges of the sides of the mouth-piece and protect the bag E from the pressed material, or prevent the latter from working through the adjacent edges of the sides of the mouth-piece, and from coming into contact with the sides of the bag fitting over the mouth-piece.

The exterior of the angle-strips may be roughened or provided with projections to prevent the bag from slipping off the mouth-piece too easily while being filled.

I claim—

1. The combination, in a bag-filling apparatus, with a pressing-box or filling-chamber, of an elastic mouth-piece at the delivery end of said box or chamber, constructed to form a recess in its rear, and of larger transverse dimensions internally at its back than the transverse interior dimensions of said box or chamber, but contracting toward its outer or delivery end, substantially as and for the purpose or purposes specified.

2. The elastic delivery mouth-piece composed of separate sides and angle strips or pieces arranged to cover the adjacent edges of said sides, and applied to the latter to admit of their independent yielding action, essentially as described.

WALLACE P. GROOM.

Witnesses:
T. J. KEANE,
E. P. JESSUP.